(12) United States Patent
Hyun

(10) Patent No.: US 11,172,661 B2
(45) Date of Patent: Nov. 16, 2021

(54) FISHING REEL HAVING MOVABLE INERTIA BRAKE

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

(*) Notice: Subject to any disclaimer, the term of this patent is extended or adjusted under 35 U.S.C. 154(b) by 15 days.

(21) Appl. No.: 16/829,284

(22) Filed: Mar. 25, 2020

(65) Prior Publication Data
US 2020/0305401 A1  Oct. 1, 2020

(30) Foreign Application Priority Data

Mar. 28, 2019  (KR) .......................... 10-2019-0036274

(51) Int. Cl.
*A01K 89/01* (2006.01)
*A01K 89/0155* (2006.01)

(52) U.S. Cl.
CPC ................................ *A01K 89/0155* (2013.01)

(58) Field of Classification Search
CPC .......... A01K 89/0155; A01K 89/01555; A01K 89/01557
See application file for complete search history.

(56) References Cited

U.S. PATENT DOCUMENTS

| 6,086,005 A * | 7/2000 | Kobayashi ....... A01K 89/01555 188/182 |
| 6,126,105 A * | 10/2000 | Yamaguchi ...... A01K 89/01555 242/288 |
| 6,206,311 B1 * | 3/2001 | Kim ..................... A01K 89/059 242/288 |
| 6,422,498 B1 * | 7/2002 | Littau ................ A01K 89/0155 242/288 |
| 2005/0178869 A1 * | 8/2005 | Hyun ............... A01K 89/01555 242/288 |
| 2009/0127367 A1 * | 5/2009 | Tsutsumi ......... A01K 89/01555 242/286 |
| 2012/0056029 A1 * | 3/2012 | Sim ................... A01K 89/0155 242/273 |

(Continued)

FOREIGN PATENT DOCUMENTS

| JP | 2005245365 | 9/2005 |
| KR | 200144801 | 6/1999 |

(Continued)

*Primary Examiner* — Emmanuel M Marcelo
(74) *Attorney, Agent, or Firm* — Cantor Colburn LLP

(57) ABSTRACT

A fishing reel having a movable inertia brake including braking magnets and a brake pad is provided. The fishing reel maximizes the advantages of a centrifugal brake, a magnet brake, and an inertia brake of the related art, such as abrasion prevention, the ability to prevent a decrease in the flying distance in casting when a spool is rotated at a low speed, and the ability to be used compatibly for a left-handed or right-handed handle. The fishing reel includes a spool plate including a spool cam, a brake pad, and a movable cam. The spool cam is fitted to a hub of a spool to rotate together with the spool, and has a pressing portion protruding to one side such that a lowest point and a highest point are connected on an incline in a radial direction.

4 Claims, 14 Drawing Sheets

(56) References Cited

U.S. PATENT DOCUMENTS

| | | | | |
|---|---|---|---|---|
| 2015/0014460 A1* | 1/2015 | Hyun | ............ | A01K 89/0155 |
| | | | | 242/289 |
| 2016/0037759 A1* | 2/2016 | Ikebukuro | ........ | A01K 89/01555 |
| | | | | 242/288 |
| 2017/0142949 A1* | 5/2017 | Sim | ............ | A01K 89/01557 |
| 2018/0338480 A1* | 11/2018 | Hyun | ............ | A01K 89/0192 |
| 2020/0236918 A1* | 7/2020 | Hyun | ............ | A01K 89/01555 |

FOREIGN PATENT DOCUMENTS

| | | |
|---|---|---|
| KR | 20120112132 | 10/2012 |
| KR | 20120133584 | 12/2012 |
| KR | 20150006698 | 1/2015 |

\* cited by examiner

FISHING REEL HAVING MOVABLE INERTIA BRAKE

CROSS REFERENCE TO RELATED APPLICATION

The present application claims priority to Korean Patent Application No. 10-2019-0036274, filed Mar. 28, 2019, the entire contents of which is incorporated herein for all purposes by this reference.

BACKGROUND OF THE INVENTION

Field of the Invention

The present invention relates to a fishing reel having a movable inertia brake including braking magnets and a brake pad. The fishing reel is configured to maximize the advantages of a centrifugal brake, a magnet brake, and an inertia brake of the related art, such as abrasion prevention, the ability to prevent a decrease in the flying distance in casting when a spool is rotated at a low speed, and the ability to be used compatibly for a left-handed or right-handed handle. The fishing reel includes a spool plate including a spool cam, a brake pad, and a movable cam. The spool cam is fitted to a hub of a spool to rotate together with the spool, and has a pressing portion protruding to one side such that a lowest point and a highest point are connected on an incline in a radial direction. The brake pad is fitted and coupled to one end of the shaft to be movable back and forth in the longitudinal direction of the shaft in one open area of a body, thereby reducing the rotation speed of the spool due to attraction of the braking magnets. The movable cam is coupled to the other surface of the brake pad, and has a pressed portion protruding to the other side to be in contact with the pressing portion. When the rotation of the spool is accelerated to a predetermined speed or higher, the pressed portion located at the lowest point of the pressing portion moves upwards on the pressing portion toward the highest point of the pressing portion, in response to the action of the inertia. Consequently, the spool plate is moved in the direction of one side so that the distance between the braking magnets and the brake pad is reduced, so that braking force to the rotation of the spool is generated and increased.

Description of the Related Art

Generally, when a fishing reel is cast, the speed of rotation of a spool to unwind a fishing line may be faster than the flying speed of a lure, thereby reducing a flying distance of the lure or entangling the fishing line, which is referred to as a backlash.

To prevent such a backlash, the fishing reel generally uses a friction brake using physical friction and a magnet brake using magnetic interaction.

A related-art friction brake includes a centrifugal brake. In the centrifugal brake, maximum rotational force occurring in an initial stage of casting is gradually reduced by friction generated by direct contact of a brake shoe to a brake pad due to centrifugal force so as to reduce the rotation speed of the spool, thereby reducing rotating braking force of the friction brake (i.e. the rotating force of the spool is proportional to the braking force). The friction brake is more advantageous than a magnet brake for long distance casting. However, the centrifugal brake has the following problems. It may be difficult to precisely adjust the braking force, the brake may be vulnerable to abrasion caused by friction between the brake shoe and the brake pad, and the brake may be noisy.

A magnet brake intended to solve such problems is a non-contact brake different from the friction brake. The magnet brake includes a plurality of braking magnets provided on a reel body, and decelerates the rotation speed of the spool by attracting the rotating spool using the magnetic force of the plurality of braking magnets.

The magnet brake of the related art is advantageous in that neither noise nor abrasion of components occurs unlike the frictional brake since none of the braking magnets contact the brake pad. In addition, it is easier to precisely adjust the braking force. In contrast, the braking force is constant irrespective of the rotation speed of the spool. That is, the braking force may be continuously generated even when the spool rotates at a low speed, thereby reducing the flying distance of casting, which is problematic.

In addition, an inertia brake has been devised by combining a movable spool plate to the magnet brake. In the inertia brake, during the rotation of the spool, the spool plate approaches the braking magnets due to inertia to reduce the rotation speed of the spool.

In the inertia brake of the related art, the position of the spool plate is varied due to a taper surface of the spool plate being in contact with a pin fitted to a shaft in a direction perpendicular to the axis of the shaft. In the case of right-handed and left-handed handles, spools rotate in different directions. The inertia brake cannot be fabricated and used to be compatible in both right-handed and left-handed fishing reels.

The foregoing is intended merely to aid in the understanding of the background of the present invention, and is not intended to mean that the present invention falls within the purview of the related art that is already known to those skilled in the art.

Documents of Related Art (Patent Document 1) Korean Patent Application Publication No. 10-2015-0006698
(Patent Document 2) Korean Utility Model Registration No. 20-0144801
(Patent Document 3) Korean Patent Application Publication No. 10-2012-0112132
(Patent Document 4) Korean Patent Application Publication No. 10-2012-0133584

SUMMARY OF THE INVENTION

Accordingly, the present invention has been made keeping in mind the above problems occurring in the related art, and the present invention is intended to propose a fishing reel having a movable inertia brake designed to maximize the advantages of a centrifugal brake, a magnet brake, and an inertia brake of the related art, such as reduced nose, abrasion prevention, and the ability to prevent a decrease in the flying distance in casting when a spool is rotated at a low speed, so that braking force may be precisely controlled, the flying distance may be increased, and convenience in use may be improved.

According to the present invention, provided is a fishing reel having a movable inertia brake, the fishing reel including: a spool axially mounted on a reel body to be rotatable, wherein the spool includes a body allowing a fishing line to be wound on an outer surface thereof and a hub connected to an inner portion of the body, with a shaft being coupled to the hub while extending through the hub; braking magnets provided outside of an outer portion of one side of the spool; a spool cam fitted to the hub to rotate together with the spool, and having a pressing portion protruding in one direction such that lowest points and highest points are circumferentially connected on an incline; and a spool plate fitted and coupled to one end of the shaft to be movable back and forth in a longitudinal direction of the shaft in an open area in one side of the body, wherein the spool plate includes a brake pad decelerating a rotation speed of the spool in response to attractive force of the braking magnets being applied thereto and a pressed portion coupled to the other side of the brake pad to protrude in the other direction to be in contact with the pressing portion. When a rotation of the spool is accelerated to a predetermined speed or higher, the pressed portion located at the lowest points of the pressing portion is moved upwards on the pressing portion toward the highest points of the pressing portion in response to an action of inertia, so that a distance between the braking magnets and the brake pad is reduced in response to the spool plate moving in a direction of one side, so that a braking force to the rotation of the spool is generated and increased.

In addition, the fishing reel may further include an elastic member pressing the spool plate in a direction of the other side to move away from the braking magnets, wherein, when the rotation of the spool is decelerated to a predetermined speed or lower, an elastic force of the elastic member exceeds the inertia, and the pressed portion is moved downwards on the pressing portion toward the lowest points of the pressing portion, so that the distance between the braking magnets and the brake pad is increased in response to the spool plate moving in a direction of the other side, so that the braking force to the rotation of the spool is reduced and removed.

In addition, in the fishing reel, the pressing portion may be a dual cam including a first cam portion and a second cam portion, the first cam portion extending from the lowest point in one side toward the highest point located in the other side opposite to the lowest point to be upwardly inclined in both directions, and the second cam portion having a different diameter from the first cam portion, being arranged concentrically with the first cam portion, and extending from the lowest point in the other side toward the highest point to be upwardly inclined in both directions, so as to be symmetrical to the first cam portion. The pressed portion may be a dual cam including a third cam portion and a fourth cam portion, the third cam portion having a shape corresponding to the first cam portion and configured to be in contact with a leading end of the first cam portion, and the fourth cam portion having a shape corresponding to the second cam portion and configured to be in contact with a leading end of the second cam portion.

In addition, in the fishing reel, the pressing portion may be a dual cam including two or more first cam portions and two or more second cam portions, the first cam portions extending from the lowest point in one side toward the highest point in the other side to be upwardly inclined in one direction, and being spaced apart from each other a predetermined distance in a circumferential direction, and the second cam portions having a different diameter from the first cam portions, being arranged concentrically with the first cam portions, extending from the lowest point in one side toward the highest point in the other side to be upwardly inclined in the other direction, and being spaced apart from each other a predetermined distance in a circumferential direction. The pressed portion may be a dual cam including two or more third cam portions and fourth cam portions, the third cam portions having a shape corresponding to the first cam portions and being configured to be in surface contact with leading ends of the first cam portions, and the fourth cam portions having a shape corresponding to the second cam portions and being configured to be in contact with leading ends of the second cam portions. The movable cam may have a first guide hole and a second guide hole provided in a circumferential direction between the adjacent third cam portions and between the adjacent fourth cam portions. The spool plate may further include a locking lever situated between and coupled to the brake pad and the movable cam to be rotatable circumferentially in both directions, the locking lever including a first stopper and a second stopper protruding from the other side to extend through guide holes to be fitted between the first cam portions and between the second cam portions. When the locking lever is rotated in a direction, one of the stoppers is caught by one end of the first cam portions or the other end of the second cam portions to restrict a direction of rotation of the spool cam to a single direction.

The fishing reel according to the present invention has been devised by combining the advantages of a friction brake, a magnet brake, and an inertia brake of the related art. In the fishing reel according to the present invention, neither noise nor abrasion of components may occur during the use of the fishing reel. Braking force may be automatically increased or decreased depending on the rotation speed of the spool, thereby preventing a backlash and increasing a flying distance in casting. A user may use the fishing reel by precisely controlling the braking force to be adequate to the user.

When the rotation speed, i.e. inertia, of the spool is reduced to a predetermined level or lower, the brake pad may automatically return in the direction of the spool, so that no braking force is generated during low-speed rotation of the spool.

The structure of the fishing reel according to the present invention may be advantageously used to be compatible in both right-handed and left-handed handles.

In some cases, the operation of the spool cam may be limited to be dedicated to a left-handed handle or a right-handed handle.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
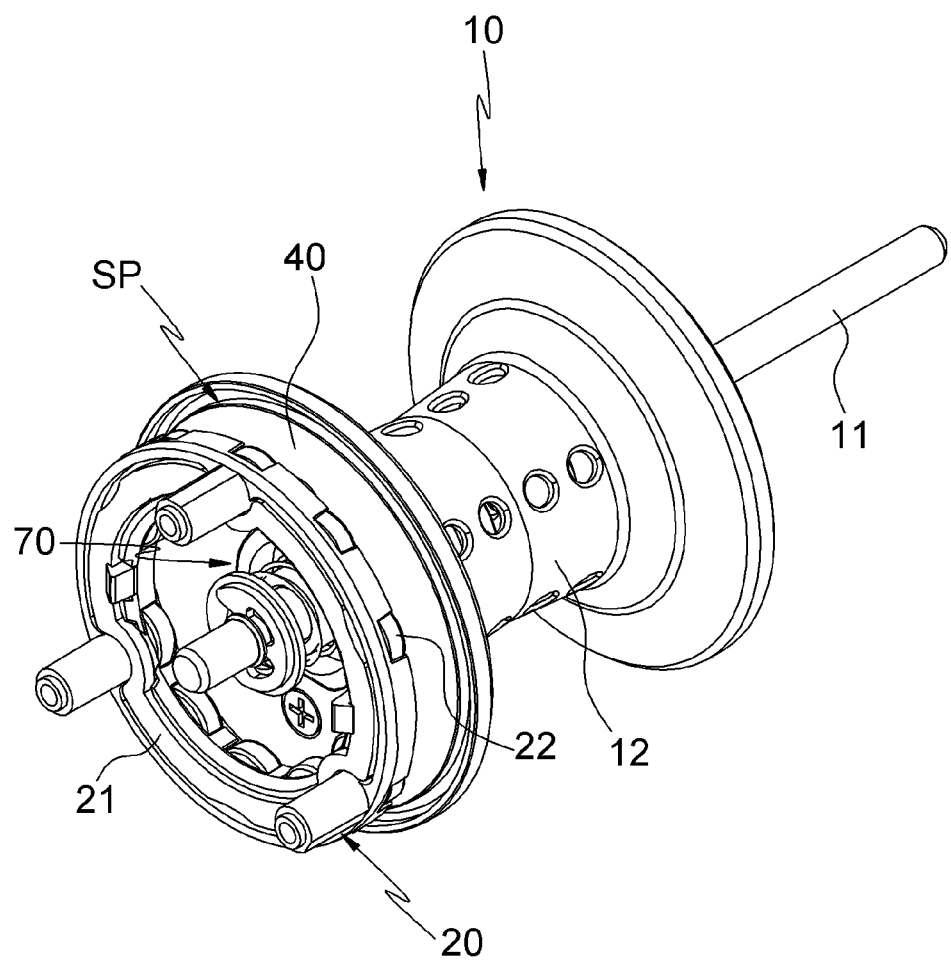
FIG. 1 is an assembled perspective view illustrating a first embodiment of the present invention.
Figure 2A:
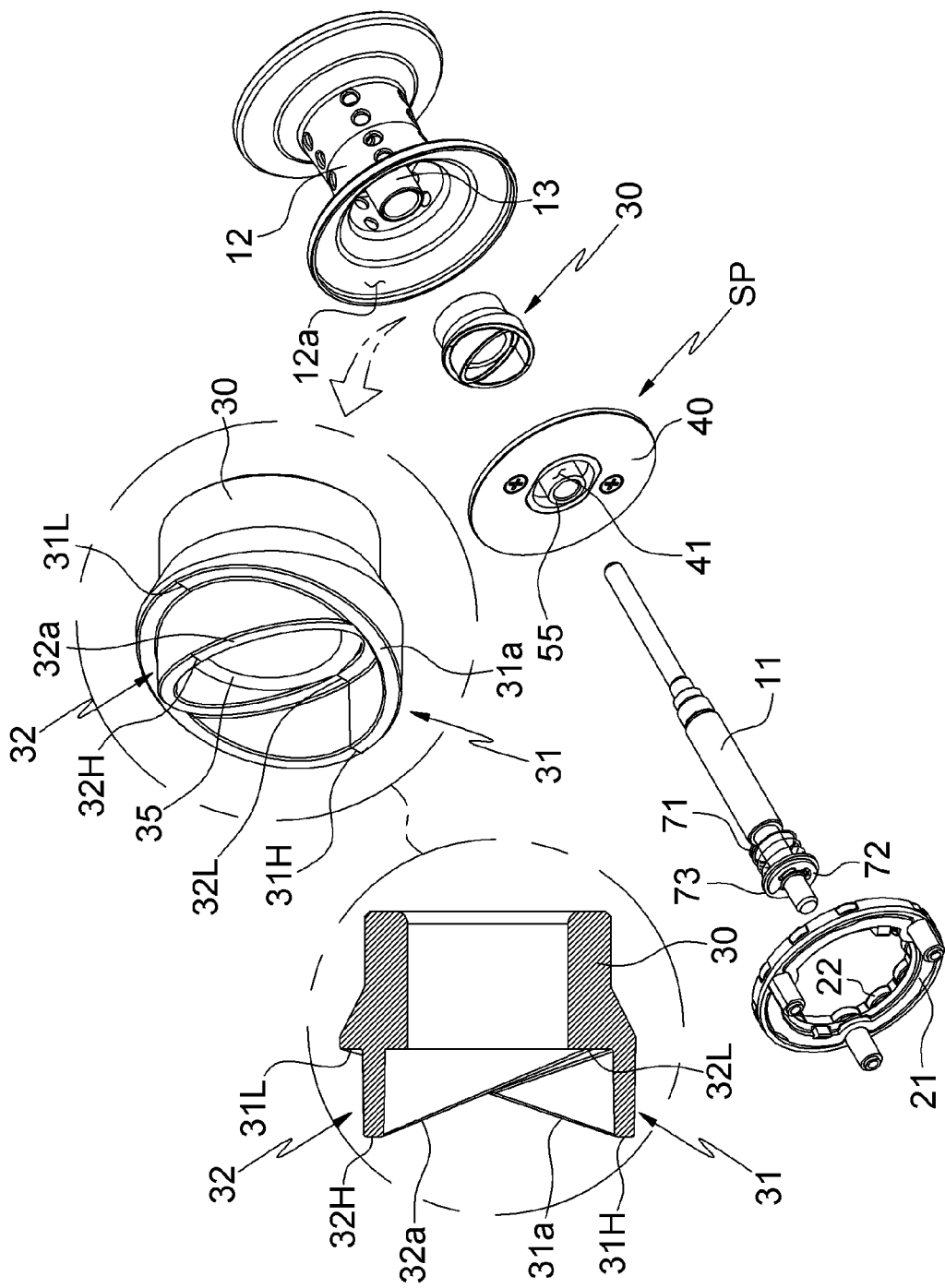
FIGS. 2A and 2B are exploded perspective views of FIG. 1.
Figure 2B:
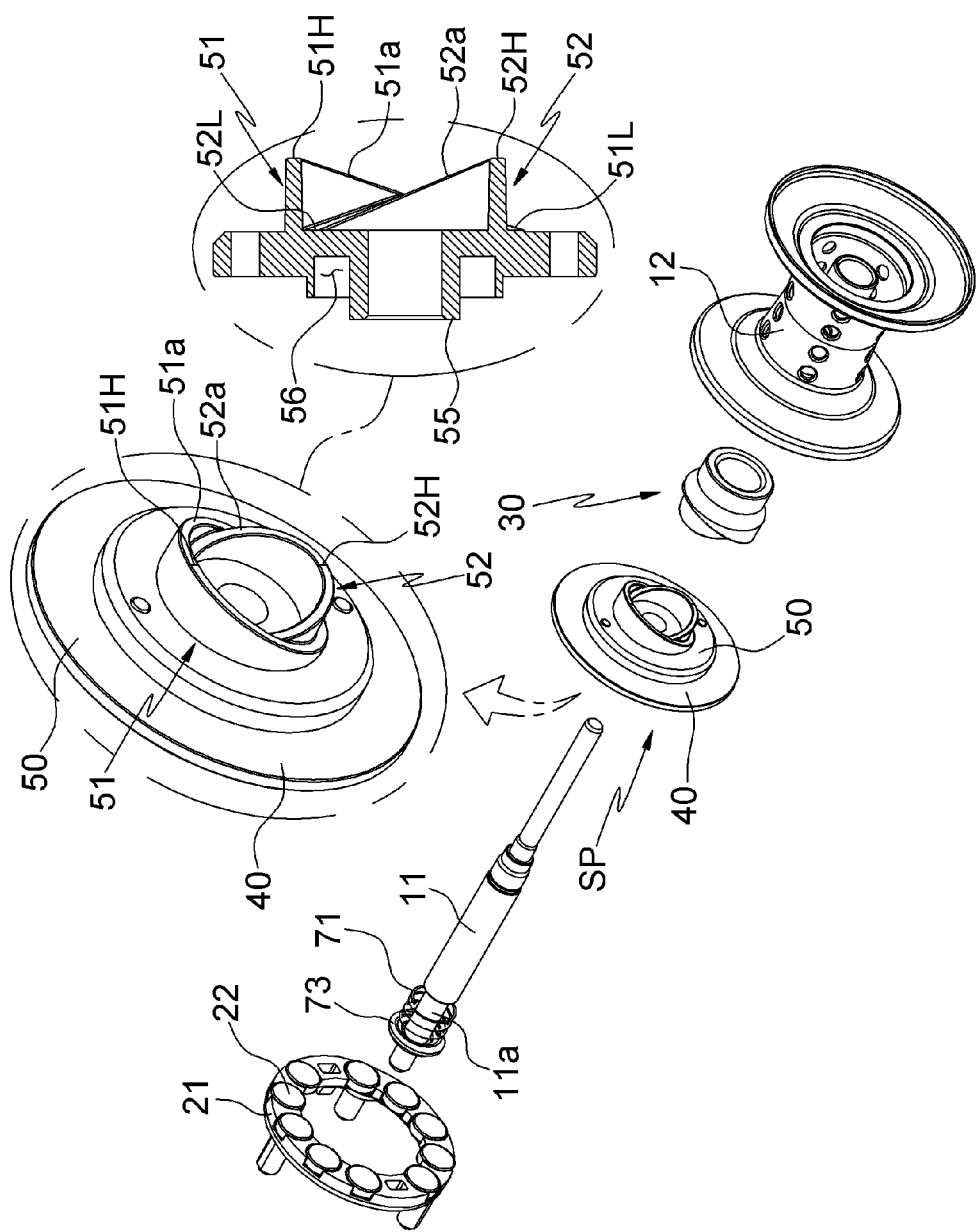

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as "a first ~" and "a second ~" are used only for the purpose for distinguishing a constitutive element from other constitutive element, but constitutive element should not be limited to a manufacturing order, and the terms described in the detailed description of the invention may not be consistent with those described in the claims.

Figure 3:
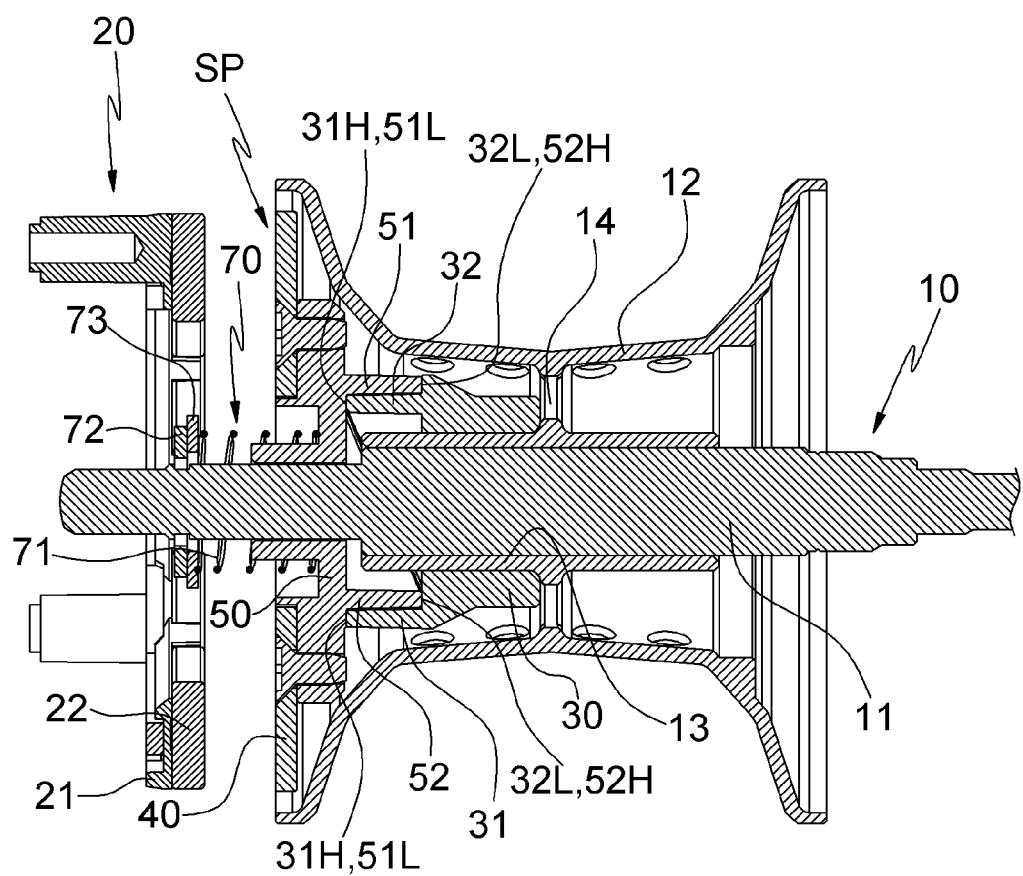
FIG. 3 is a longitudinal cross-sectional view of FIG. 1.
Figure 4A:
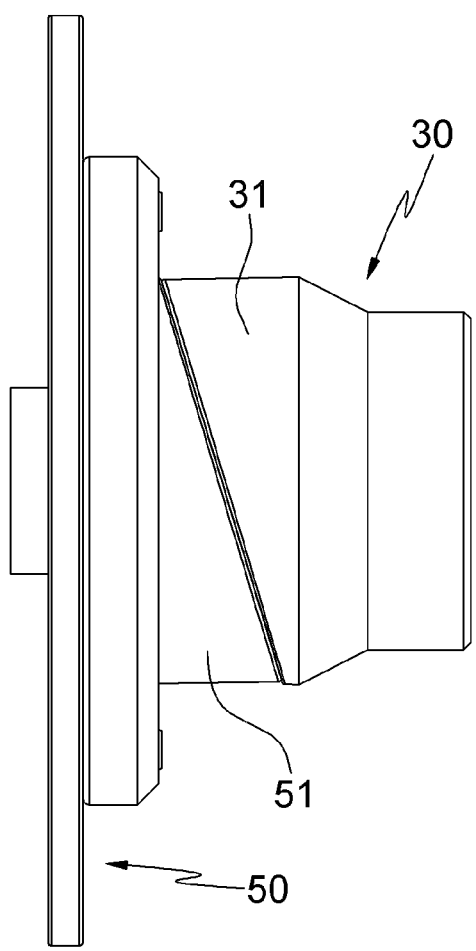
FIGS. 4A and 4B are front views of key portions of the first embodiment to illustrate forward and backward movements of the spool plate.
Figure 4B:
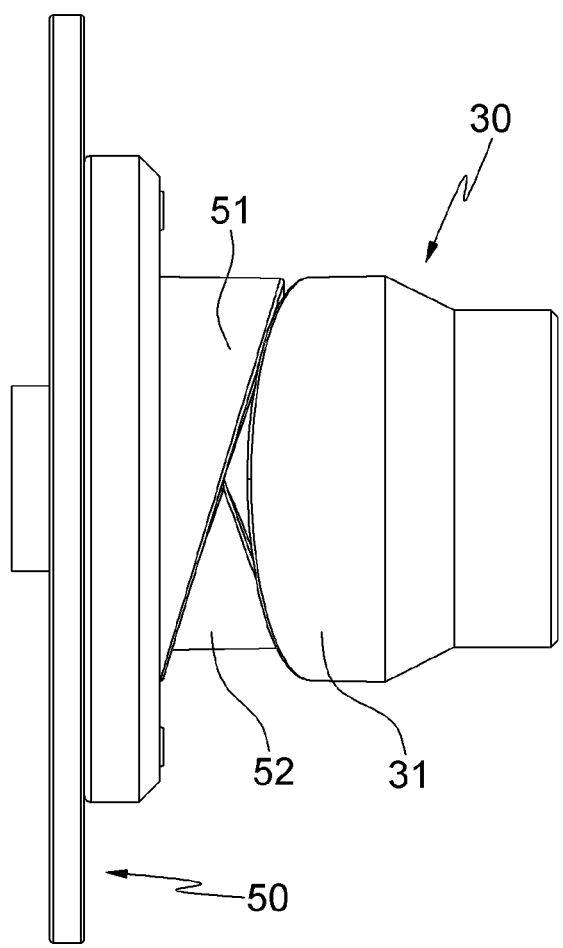
Figure 5:
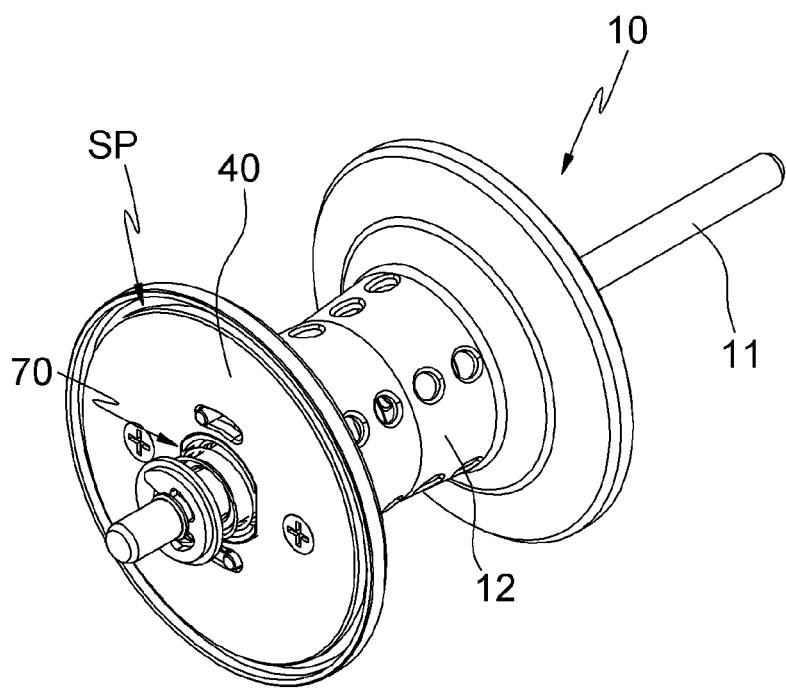
FIG. 5 an assembled perspective view illustrating a second embodiment of the present invention.
Figure 6A:
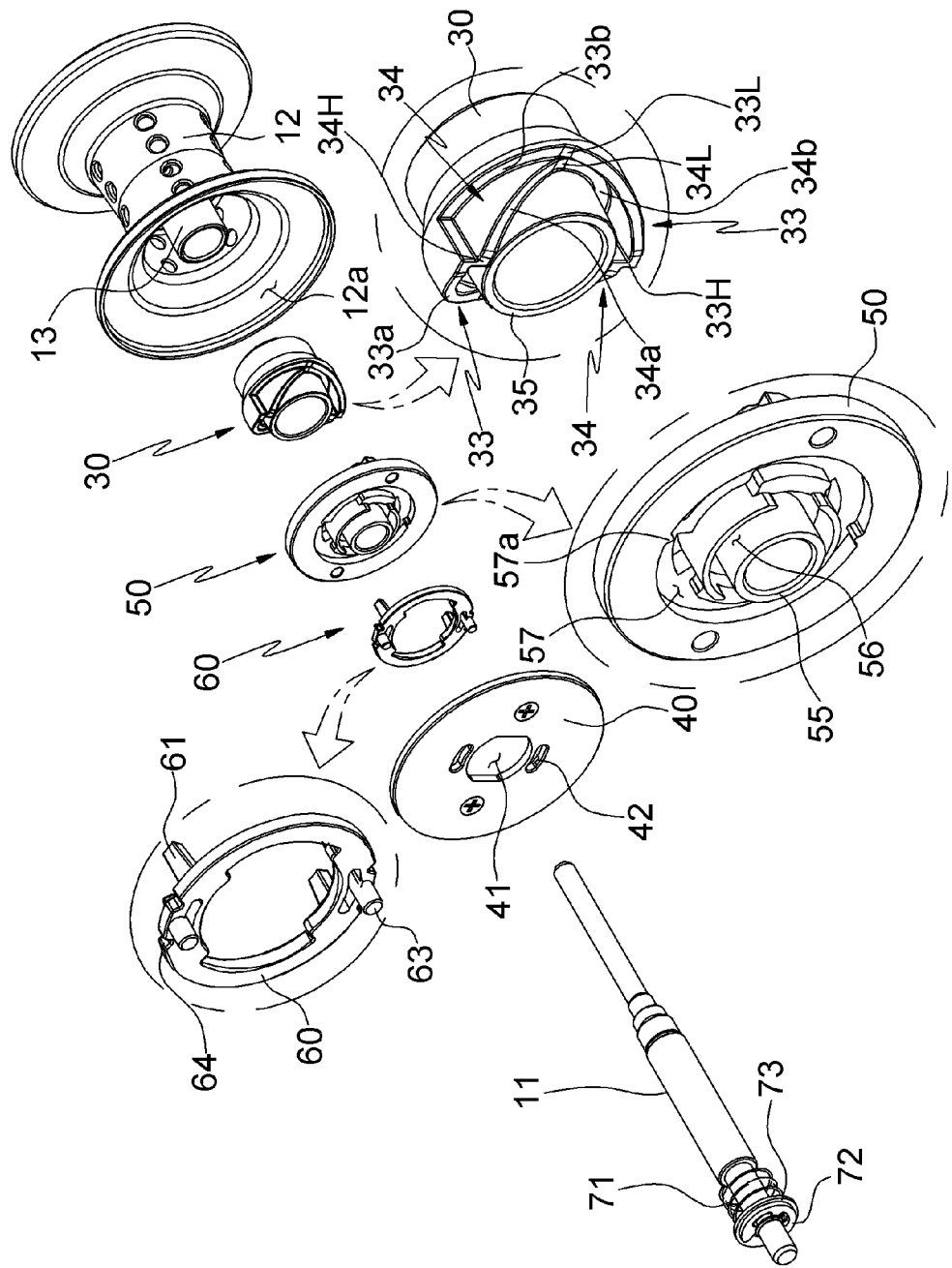
FIGS. 6A and 6B are exploded perspective views of FIG. 5.
Figure 6B:
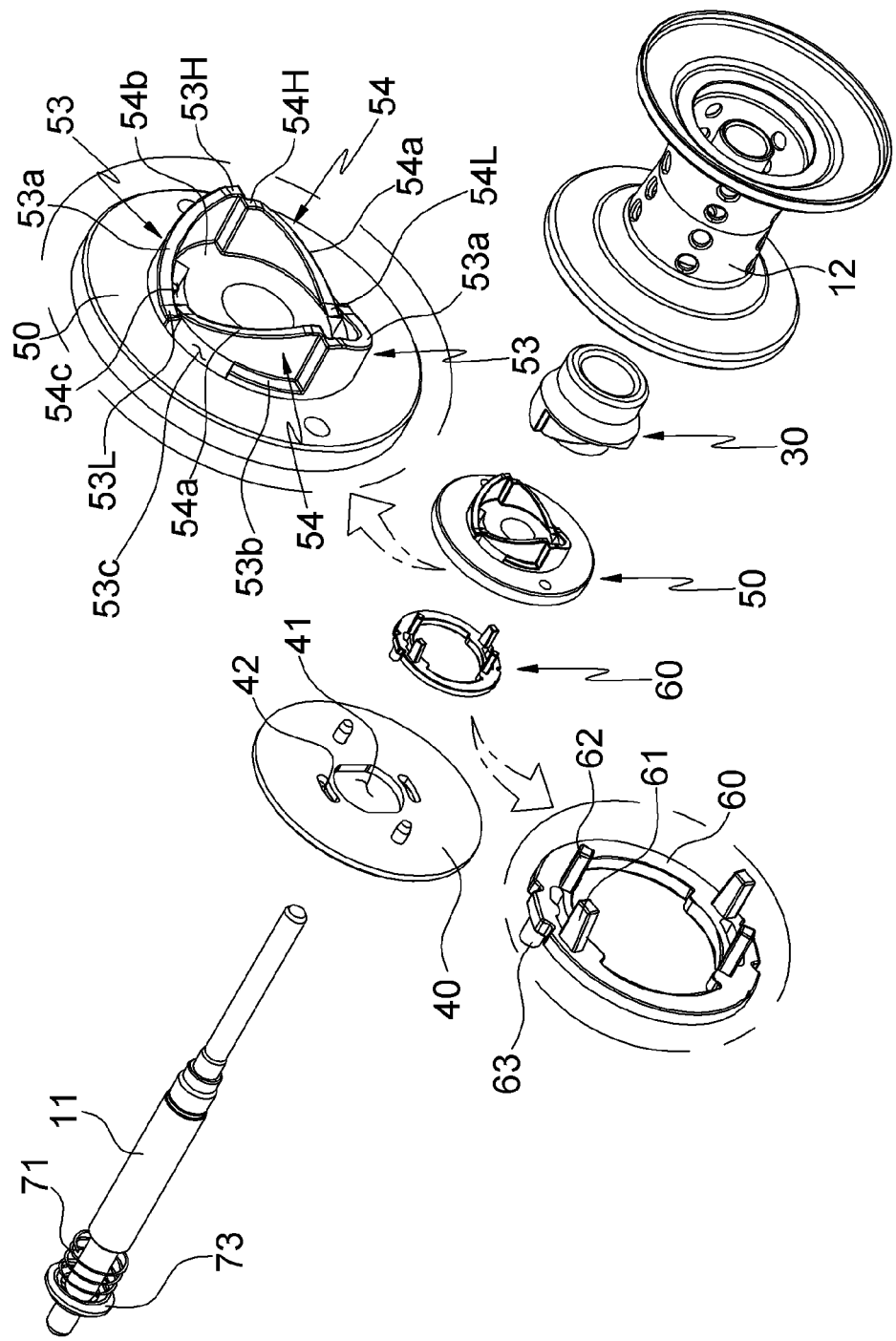
Figure 7:
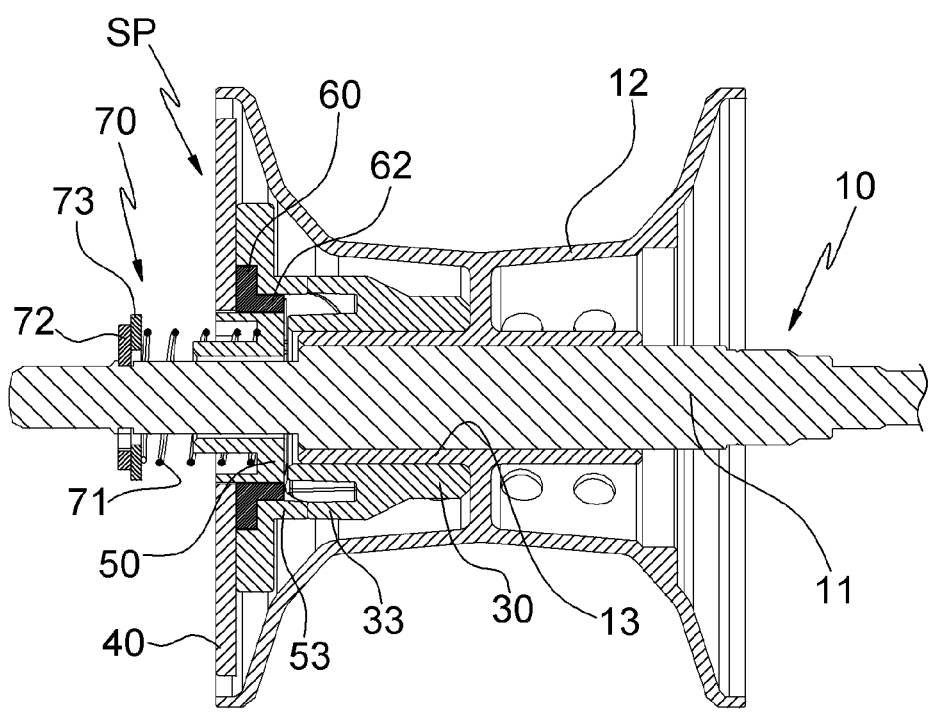
FIG. 7 is a longitudinal cross-sectional view of FIG. 5.

In description of a fishing reel including a movable inertia brake according to the present invention, approximate directions will be defined with reference to FIGS. 3 and 7 for the sake of brevity, such that upward, downward, left, and right directions are determined to be directions as viewed by referring to a downward direction as being in the direction of gravity. In the Detailed Description of the Invention section taken in conjunction with the drawings and the Claims section, directions will be specified and described on this basis unless otherwise stated.

Hereinafter, the fishing reel including a movable inertia brake according to the present invention will be described with reference to the accompanying drawings.

The present invention relates to the fishing reel including a movable inertia brake. As illustrated in FIGS. 1 to 4B illustrating a first embodiment of the present invention and FIGS. 5 to 8D illustrating a second embodiment of the present invention (a magnetic force generator 20 is omitted for the sake of brevity in FIGS. 5 to 6B), the fishing reel generally includes a spool 10 on which a fishing line is wound, as well as other components constituting an inertia brake, such as braking magnets 22, a spool cam 30, a spool plate SP, and an elastic member 70. The spool plate SP includes a brake pad 40, a movable cam 50, and a locking lever 60.

The spool 10 is axially mounted on a known reel body (not shown) via a shaft 11. Both ends of the shaft 11 are axially coupled to both side frames (or side covers) of the reel body, such that the spool 10 rotates together with the shaft 11.

The spool 10 has a drum structure in the shape of pulley, and includes a body 12 and a hub 13. The body 12 allows the fishing line to be wound on the outer surface thereof, with both sides of the body 12 being open. The hub 13 is connected to the interior of the body 12, and the shaft 11 is coupled to the hub 13 while extending through the hub 13.

The hub 13 is connected to a partition 14 isolating both internal spaces of the body 12 while protruding in the longitudinal direction of the shaft 11.

In addition, the braking magnets 22 are fixedly mounted on an outer portion of one side (i.e. the left side in the drawings) of the spool 10.

Specifically, the braking magnets 22 are a plurality of braking magnets 22 radially mounted on an annular magnet plate 21, thereby constituting the magnetic force generator 20. The magnetic force generator 20 is fixedly mounted on the inner surface of one side of the reel body.

Here, the magnetic force generator 20 is configured to be moved back and forth in the longitudinal direction of the shaft 11 by a braking dial (not shown) exposed externally from the reel body (or a side cover on the palm side), so that a user may adjust the position of the braking magnets 22 (i.e. the position at which maximum braking force is generated) using the braking dial.

That is, a decrease in the length between the braking magnets 22 and the brake pad 40 reduces a time length for which the brake pad 40 moves to be closest to the braking magnets 22. Thus, when the spool 10 rotates at a relatively low speed, maximum braking force is generated.

In contrast, an increase in the length between the braking magnets 22 and the brake pad 40 increases the time length for which the brake pad 40 moves to be closest to the braking magnets 22. Thus, an adjustment may be enabled so that maximum braking force is generated only when the spool 10 rotates at a relatively high speed.

Next, the spool cam 30 is fitted to the hub 13 to rotate together with the spool 10. The spool cam 30 has a pressing portion protruding in one direction such that lowest points 31L, 32L, 33L, and 34L and highest points 31H, 32H, 33H, and 34H are circumferentially connected on an incline.

The spool cam 30 is fitted on one end of the hub 13. Here, the spool cam 30 is fixed and coupled to the hub 13, such that the spool cam 30 rotates together with the hub 13, i.e. the spool 10 and the shaft 11.

The pressing portion of the spool cam 30 has the shape of a cam connected to have a height difference. The pressing portion has different specific configurations and structures according to the first and second embodiments. However, the first and second embodiments have no difference in basic concept in that the spool plate SP is moved back and forth using the height difference during accelerated rotation of the spool 10, except for a structural difference therebetween according to whether or not the locking lever 60 is present. The structural difference will be described later.

In addition, the spool plate SP is fitted to one end portion of the shaft 11 such that the spool plate SP is movable back and forth in the longitudinal direction of the shaft 11 in an open area 12a in one side of the body 12, and includes the brake pad 40 and the movable cam 50. The brake pad 40 decelerates the rotation speed of the spool 10 in response to attractive force of the braking magnets 22 acting thereon. The movable cam 50 has a pressed portion coupled to the other side (i.e. the right side in the drawings) of the brake pad 40 and protruding in the other direction to be in contact with the pressing portion.

The spool plate SP is fitted on one-side connector 11a of the shaft 11, in a position outside of the hub 13. Here, the spool plate SP has a structure able to idle on the connector 11a.

Specifically, the brake pad 40 has a fitting hole 41 to which a projecting portion protruding from one side surface of the movable cam 50 is fitted, and is coupled to the movable cam 50 using bolts.

The movable cam 50 has the pressed portion protruding from the other side surface. A support pipe 55 protrudes from the central portion of one side surface, such that the connector 11a is fitted to the support pipe 55. A support recess 56 is provided concavely around the outer circumference of the support pipe 55.

Also in the spool plate SP, the brake pad 40 and the movable cam 50 may have different configurations and structures according to the first and second embodiments, like the spool cam 30. However, the first and second embodiments have no difference in basic concept in that an outward pressure for forward movement is applied from the spool cam 30 in response to the action of inertia during accelerated rotation of the spool 10 and an inward pressure for backward movement is applied from the elastic member 70 during decelerated rotation of the spool 10, except for a structural difference therebetween according to whether or not the locking lever 60 is present. The structural difference will be described later.

Next, the elastic member 70 includes a compressive spring 71 serving to press the spool plate SP away from the braking magnets 22 in the direction of the other side.

The compressive spring 71 is fitted on one end of the shaft 11 to apply elastic force in a direction opposite to compression.

One end of the compressive spring 71 is supported by a washer 73 fixed to a predetermined location of one end of the shaft 11 by a retainer 72. The other end of the compressive spring 71 is supported in a support recess 56 of the spool plate SP (more particularly the movable cam 50). The compressive spring 71 forces the spool plate SP, i.e. the brake pad 40, to move backwards in the direction of the spool cam 30, opposite to the braking magnets 22.

According to the present invention as described above, when the rotation of the spool 10 is accelerated to a predetermined speed or higher, the pressed portion located at the lowest points 31L, 32L, 33L, and 34L of the pressing portion is moved upwards on the pressing portion toward the highest points 31H, 32H, 33H, and 34H of the pressing portion. As the spool plate SP is moved forwards in the direction of one side, the distance between the braking magnets 22 and the brake pad 40 is decreased, thereby generating and increasing braking force to the rotation of the spool 10. When the rotation of the spool 10 is decelerated to a predetermined speed or lower, the elastic force of the elastic member 70 exceeds the inertia, so that the pressed portion is moved downwards on the pressing portion toward the lowest points 31L, 32L, 33L, and 34L of the pressing portion. As the spool plate SP is moved backwards in the direction of the other side, the distance between the braking magnets 22 and the brake pad 40 is increased, thereby reducing and removing the braking force to the rotation of the spool 10.

That is, when the fishing reel is cast, the spool 10 starts to instantaneously rotate so that the pressing portion pushes the pressed portion in the direction of forward rotation of the spool 10. Due to the incline structure of the pressing portion, the movable cam 50 is rotated together while being forced and pushed toward one side in the longitudinal direction of the shaft 11.

At this time, when the rotation of the spool 10 is accelerated to a predetermined speed or higher, the inertia of the spool cam 30 exceeds the elastic force of the elastic member 70, thereby acting toward one side in the longitudinal direction of the shaft 11. Consequently, the spool plate SP approach the braking magnets 22 while being pushed in the direction of the braking magnets 22 by the inertia. Then, attractive force acting on the brake pad 40 is increased to generate braking force to the spool 10, thereby preventing a backlash that would otherwise be caused by the overspeed of the spool 10.

In addition, when the spool 10 is decelerated to a predetermined speed or lower by the braking magnets 22 during casting, the inertia that has been pressing the spool plate SP in the direction of the braking magnets 22 is reduced, so that the elastic force of the elastic member 70 exceeds the inertia of the spool cam 30 to act toward the other side in the longitudinal direction of the shaft 11. Consequently, the elastic member 70 drives the spool plate SP to returned the direction opposite to the braking magnets 22 so as to move away from the braking magnets 22. Then, the attractive force acting on the brake pad 40 is decreased to reduce the braking force to the spool 10, thereby preventing a decrease in the flying distance during low-speed rotation of the spool 10.

Next, specific configurations, operations, and effects of the first and second embodiments having the above-described configurations will be described in detail.

First, the first embodiment of the present invention is illustrated in FIGS. 1 to 4B.

The pressing portion is a dual cam including a first cam portion 31 and a second cam portion 32. The first cam portion 31 extends from the lowest point 31L in one side toward the highest point 31H located in the other side opposite to the lowest point 31L to be upwardly inclined in both directions. The second cam portion 32 having a different diameter from the first cam portion 31 is arranged concentrically with the first cam portion 31. The second cam portion 32 extends from the lowest point 32L in the other side toward the highest point 32H to be upwardly inclined in both directions, so as to be symmetrical to the first cam portion 31.

The pressed portion is a dual cam including a third cam portion 51 and a fourth cam portion 52. The third cam portion 51 has a shape corresponding to the first cam portion 31, and is configured to be in contact with the leading end of the first cam portion 31. The fourth cam portion 52 has a shape corresponding to the second cam portion 32, and is configured to be in contact with the leading end of the second cam portion 32.

The first to fourth cam portions 31, 32, 51, and 52 have the shape of a cone, one outer circumferential portion of which is chamfered. A semicircular inclined guide surface 31a is provided on both sides of the lowest point 31L and extends toward the highest point 31H.

In addition, the first cam portion 31, the third cam portion 51, the second cam portion 32, and the fourth cam portion 52 have the same diameter. Here, the first and third cam portions 31 and 51 and the second and fourth cam portions 32 and 52 are arranged in an intersecting manner such that the highest points and lowest points thereof are located in opposite directions.

In a parking position of the spool 10, when the spool plate SP is moved backwards in the direction of the spool cam 30 by the elastic member 70, the lowest point 51L and the highest point 51H of the third cam portion 51 are located at the highest point 31H and the lowest point 31L of the first cam portion 31, and the lowest point 52L and the highest point 52H of the fourth cam portion 52 are located at the highest point 32H and the lowest point 32L of the second cam portion 32. In this manner, inclined guide surfaces 51a and 52a of the movable cam 50 are in surface contact with the inclined guide surfaces 31a and 32a of the spool cam 30 so that the spool cam 30 and the movable cam 50 are completely engaged with each other.

As described above, in the parking position of the spool 10 before casting, the movable cam 50 is moved backwards by the compressive spring 71 to come into surface contact with the spool cam 30, thereby increasing the distance between the braking magnets 22 and the brake pad 40 to the maximum distance, so that no braking force is generated.

When the fishing reel is cast from this position, as described above, the spool 10 is rotated while the fishing line is being unwound. At this time, the first and second cam portions of 31 and 32 of the spool cam 30 push the third and fourth cam portions 51 and 52 of the movable cam 50, thereby causing the movable cam 50 to rotate together.

In addition, when the rotation of the spool 10 is accelerated to a predetermined speed or higher, the inertia is applied to the movable cam 50 due to the pressure of the spool cam 30, so that the lowest points 51L and 52L of the third and fourth cam portions 51 and 52 move on the inclined guide surfaces 31a and 32a toward the highest points 31H and 32H of the first and second cam portions 31 and 32. In response to this movement, the spool plate SP, i.e. the brake pad 40 moves in the direction of the braking magnets 22, so that braking force is generated by magnetic force. As the brake pad 40 approaches the braking magnets 22, the braking force is gradually stronger. When the compressive spring 71 is completely compressed, i.e. when the brake pad 40 is closest to the braking magnets 22, maximum braking force is generated.

In addition, with decreases in the rotation speed of the spool 10 during casting, the inertia applied to the spool plate SP is reduced, so that the elastic force of the compressive spring 71 exceeds the inertia to press the spool plate SP in the direction of the spool cam 30. Consequently, as the third and fourth cam portions 51 and 52 move downward on the inclined guide surfaces 31a and 32a of the first and second cam portions 31 and 32, the movable cam 50 is moved backwards while rotating backwards to engage with the spool cam 30. (Here, the term "rotating backwards" indicates that only the movable cam 50 moves backwards to return to the original position while rotating at a speed slower than that of the spool cam 30 due to the idling structure between the movable cam 50 and the shaft 11 in a situation in which both the spool cam 30 and the movable cam 50 are simultaneously rotated forward in the same direction as the spool 10, and should be interpreted as the relative direction of rotation with respect to the spool cam 30.) As the brake pad 40 is moved away from the braking magnets 22 with the spool plate SP moving backwards in the direction of the spool cam 30, the braking force generated by the forward movement of the spool plate SP is gradually decreased.

Here, according to the first embodiment of the present invention, the inclined guide surfaces 31a and 51a of the first and second cam portions 31 and 51 are upwardly inclined in directions opposite to the inclined guide surfaces 32a and 52a of the third and fourth cam portions 2 and 4. Thus, even in the case that the spool 10 is rotated in any direction of one direction (i.e. forward direction, for example, clockwise direction) and the other direction (i.e. reverse direction, for example, counterclockwise direction) during casting, the movable cam 50 can be pressed forwards in the direction of the braking magnets 22 by the spool cam 30. Consequently, the movable inertia brake according to the present invention may be used in common irrespective of whether or not the handle of the fishing reel is designed for the left handed or the right handed (i.e. irrespective of the direction of rotation of the spool to unwind the fishing line).

Next, the second embodiment of the present invention will be described.

The second embodiment of the present invention is illustrated in FIGS. 5 to 8D.

The pressing portion is a dual cam including two or more first cam portions 33 and two or more second cam portions 34. The first cam portions 33 extend from the lowest point 33L in one side toward the highest point 33H in the other side to be upwardly inclined in one direction. The first cam portions 33 are spaced apart from each other a predetermined distance in the circumferential direction. The second cam portions 34 having a different diameter from the first cam portions 33 are arranged concentrically with the first cam portions 33. The second cam portions 34 extend from the lowest point 34L in one side toward the highest point 34H in the other side to be upwardly inclined in the other direction. The second cam portions 34 are spaced apart from each other a predetermined distance in the circumferential direction.

The pressed portion is a dual cam including two or more third cam portions 53 and fourth cam portions 54. The third cam portions 53 have a shape corresponding to the first cam portions 33, and are configured to be in surface contact with the leading ends of the first cam portions 33. The fourth cam portions 54 have a shape corresponding to the second cam portions 34, and are configured to be in contact with the leading ends of the second cam portions 34.

The movable cam 50 has a first guide hole 53c and a second guide hole 54c provided in the circumferential direction between the adjacent third cam portions 53 and between the adjacent fourth cam portions 54.

The second embodiment further includes the locking lever 60 situated between and coupled to the brake pad 40 and the movable cam 50 to be rotatable circumferentially in both directions. The locking lever 60 includes first stoppers 61 and second stoppers 62 protruding from the other side to extend through the guide holes 53c and 54d to be fitted between the first cam portions 33 and between the second cam portions 34.

When the locking lever 60 is rotated in any direction, one of the stoppers 61 and 62 can be caught by one end of the first cam portions 33 or the other end of the second cam portions 34 to restrict the direction of rotation of the spool cam 30 to a single direction (i.e. the direction of rotation the same as that of the locking lever 60).

The pressing portion and the pressed portion of the second embodiment have the dual cam structure as in the case of the first embodiment. However, the second embodiment differs from the first embodiment in that the first to fourth cam portions 33, 34, 53, and 54 of the second embodiment are spaced part predetermined distances while being arranged concentrically, and inclined guide surfaces 33a and 53a of the first and third cam portions 33 and 53 arranged concentrically in inner and outer positions and inclined guide surfaces 34a and 54a of the second and second cam portions 34 and 54 are inclined in opposite directions, while the first to fourth cam portions 31, 32, 51, and 52 of the first embodiment are connected integrally into a circular shape.

Specifically, in the first cam portions 33, the lowest points 33L and the highest points 33H are sequentially arranged while being radially spaced apart from each other predetermined distances. The inclined guide surfaces 33a connecting the lowest points 33L and the highest points 33H are upwardly inclined in one direction.

In addition, in the second cam portions 34 having a different diameter from the first cam portions 33, the lowest points 34L and the highest points 34H are provided at the same positions as in the first cam portions 33. The inclined guide surfaces 34a connecting the lowest points 34L and the highest points 35H are upwardly inclined in the other direction opposite to the first cam portions 33.

The first cam portions 33 and the second cam portions 34 have horizontal guide surfaces 33b and 34b arranged concentrically at predetermined distances. The horizontal guide surfaces 33b and 34b respectively extend horizontally at the height of the lowest points 33L and the 34L without any inclination between the cam portions.

Here, unlike the first embodiment, the second embodiment is characterized in that a portion (i.e. the horizontal guide surfaces 34b) between the inner cam portions (i.e. the second cam portions 34 in the drawings) of the spool cam 30 is provided as a hollow space, such that the spool cam 30 is not in complete surface contact with the hub 13. For safe coupling, the spool cam 30 according to the second embodiment includes a pipe portion 35 protruding and extending from the inner circumferential portion of the inner second cam portion 34 in one direction toward the highest point 34H.

In addition, in the third cam portions 53 and the fourth cam portions 54, the lowest points 53L and 54L are provided radially at positions of the highest points 33H and 34H of the first and second cam portions 33 and 34 and the highest points 53H and 54H are provided radially at positions of the lowest points 33L and 34L of the first and second cam portions 33 and 34, in a manner corresponding to the first cam portions 33 and the second cam portions 34.

The inclined guide surfaces 53a and 54a extending from the lowest point 53L and 54L toward the highest points 53H and 53H extend to be upwardly inclined in the same direction as the inclined guide surfaces 33a and 34a of the first cam portions 33 and the second cam portions 34. The third cam portions 53 and the fourth cam portions 54 are arranged concentrically at predetermined distances such that the horizontal guide surfaces 53b and 54b are provided between the cam portions.

Here, first and second guide holes 53c and 54c are provided between the third cam portions 53 and between the fourth cam portions 54. The first and second guide holes 53c and 54c are formed by penetrating portions of the horizontal guide surface 53b and 54b from one surface to the other surface into an arc shape.

In addition, in the movable cam 50 according to the second embodiment, an accommodation recess 57 extends around the support pipe 55, concavely defined by a sidewall of the movable cam 50, such that the locking lever 60 is inserted into the accommodation recess 57.

In addition, one or more catching protrusions 57a protrude inwardly from the inner circumferential surface of the accommodation recess 57.

Next, the locking lever 60 is an annular member fitted to the accommodation recess 57 to rotate to the left and right on the sidewall of the movable cam 50. The first and second stoppers 61 and 62 protrude from the other surface of the locking lever 60 to be fitted to and slidably coupled to the first and second guide holes 53c and 54c of the movable cam 50.

In addition, one or more operation lugs 63 protrude from one surface of the locking lever 60.

The brake pad 40 has guide holes 42 penetrating the brake pad 40 from one surface to the other surface into an arc shape, corresponding to the operation lugs 63.

The operation lugs 63 are fitted to and slidably coupled to the guide holes 42, such that the locking lever 60 may be rotated in opposite directions using the operation lugs 63.

In addition, the locking lever 60 has a pair of catching recesses 64 on the outer circumferential surface, such that the catching protrusions 57a are caught by the catching recesses 64. The catching recesses 64 are spaced apart by the same distances as the guide holes 53c and 54c.

As in the case of the first embodiment, according to the second embodiment, in a parking position of the spool 10, the movable cam 50 is moved backwards in the direction of the spool cam 30 by the compressive spring 71, so that the inclined guide surfaces 53a and 54a of the movable cam 50 are in surface contact with the inclined guide surfaces 33a and 34a of the spool cam 30 while the lowest points 53L and the highest points 53H of the third cam portions 53 are located at the highest points 33H and the lowest points 33L of the first cam portions 33 and the lowest points 54L and the highest points 54H of the fourth cam portions 54 are located at the highest points 34H and the lowest points 34L of the second cam portions 34.

In this position, no braking force is generated since the magnetic force of the braking magnets 22 is not applied to the brake pad, as in the case of the first embodiment.

Figure 8A:
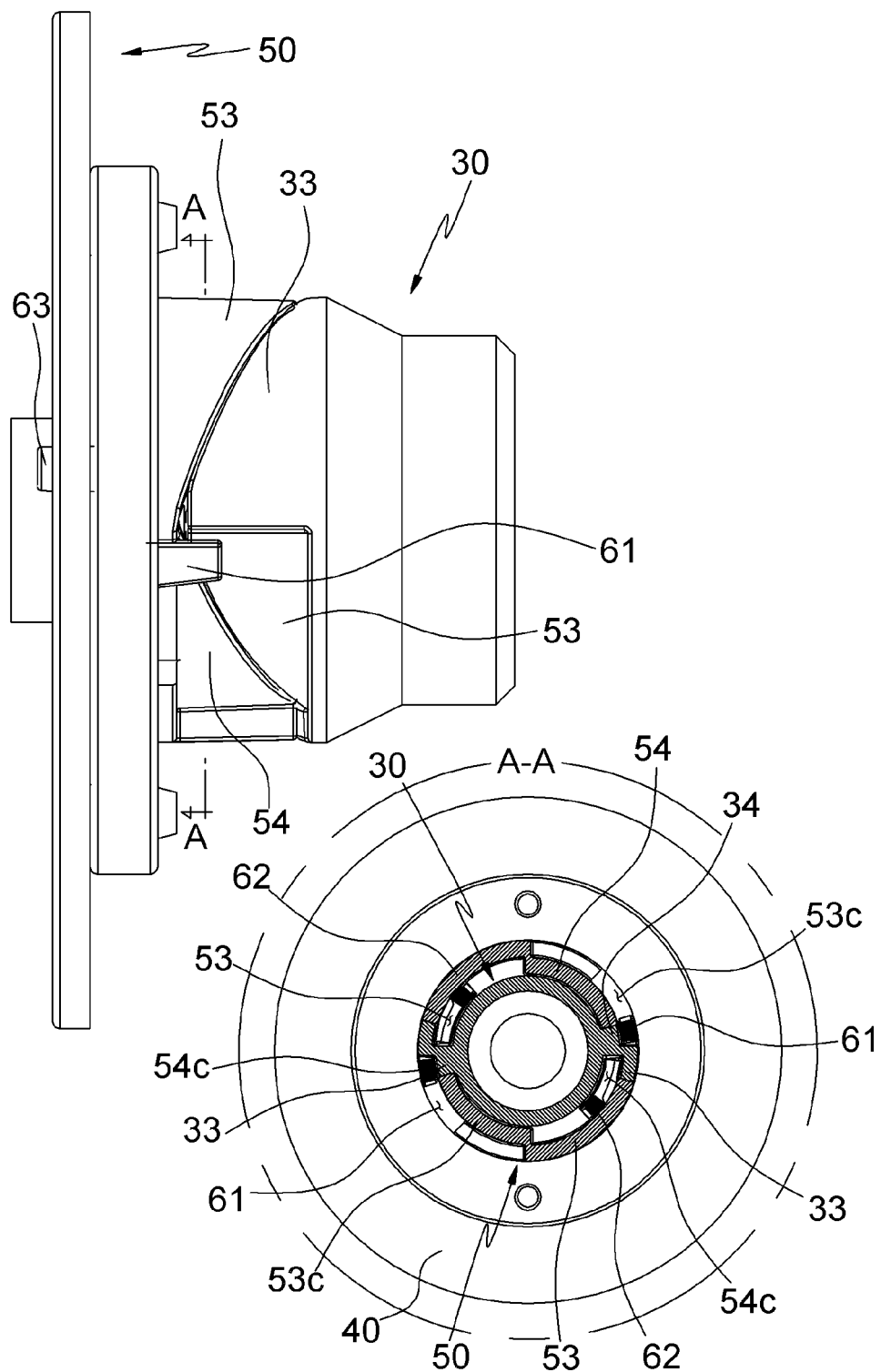
FIGS. 8A to 8D are front views of key portions of the second embodiment to illustrate forward and backward movements of the spool plate.

Here, as illustrated in FIG. 8A, when the locking lever 60 is rotated in one direction (i.e. clockwise direction), the first stoppers 61 move to one end of the first guide hole 53c to come into contact with and be caught by the side surfaces of the highest points 33H of the first cam portions 33, and the second stoppers 62 move to the other end of the second guide hole 54c to be spaced apart from the highest points 34H of the second cam portions 34 in the direction of one side. In this position, the spool cam 30 is only allowed to rotate in one direction by the first stoppers 61.

Figure 8B:
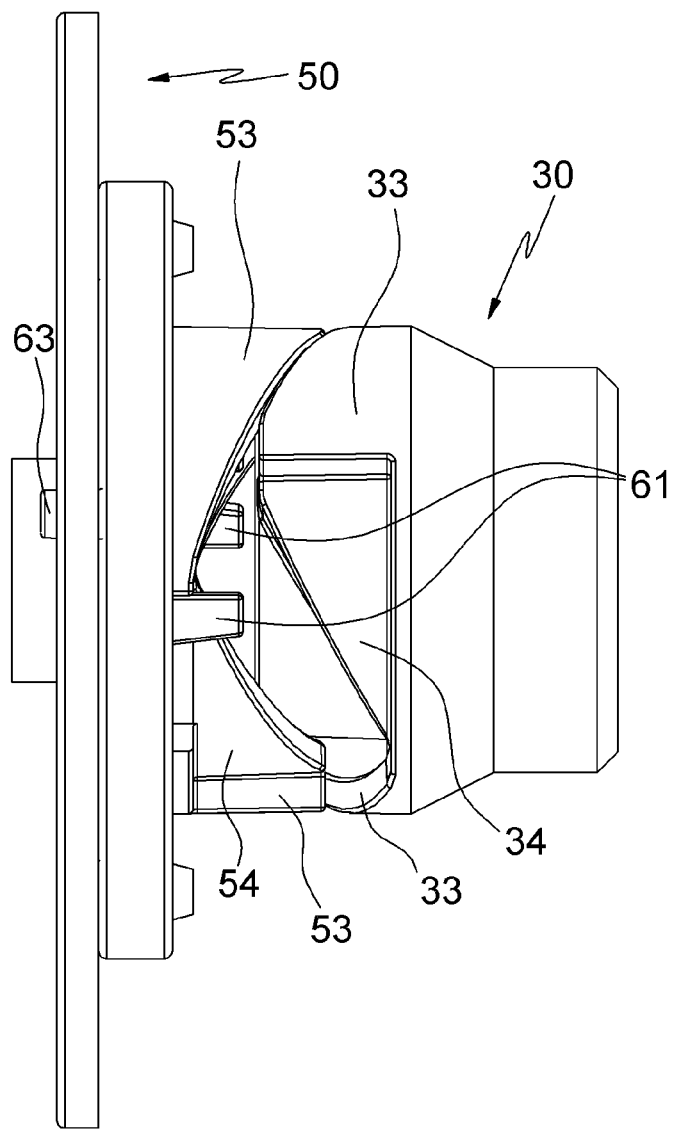

Accordingly, in a situation in which the second embodiment of the present invention is mounted on a fishing reel for the left handed (or the right handed) in which the spool 10 is rotatable in one direction, after the direction of rotation of the spool cam 30 is set to be the same as that of the spool 10 using the locking lever 60, casting is performed. Then, when the rotation of the spool 10 is accelerated to a predetermined speed or higher while the fishing line is being unwound, the third cam portions 53 of the movable cam 50 move outwards on the first cam portions 33 of the spool cam 30, as illustrated in FIG. 8B, so that braking force is generated. When the rotation speed of the spool 10 is decelerated to a predetermined speed or lower, the movable cam 50 is returned to the original position in the direction of the spool cam 30 by the compressive spring 71, so that the braking force is removed.

Figure 8C:
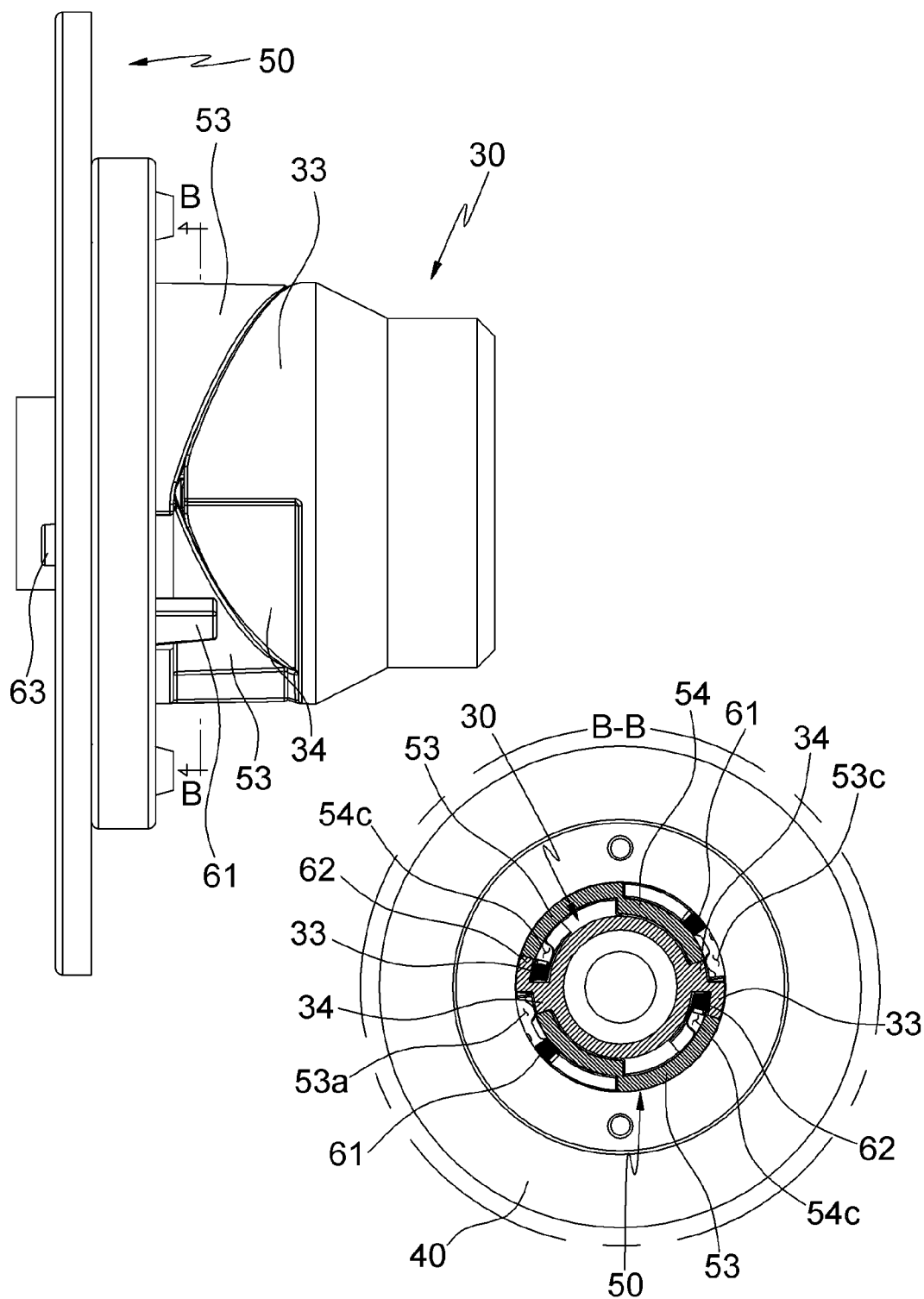

In contrast, as illustrated in FIG. 8C, when the locking lever 60 is rotated in the other direction (i.e. counterclockwise direction), the first stoppers 61 move to the other end of the first guide hole 53c to be spaced apart from the highest points 33H of the first cam portions 33 in the direction of the other side, and the second stoppers 62 move to the other end of the second guide hole 54c to come into contact with and be caught by the side surfaces of the highest points 34H of the second cam portions 34. In this position, the spool cam 30 is only allowed to rotate in the direction of the other side by the second stoppers 62.

Figure 8D:
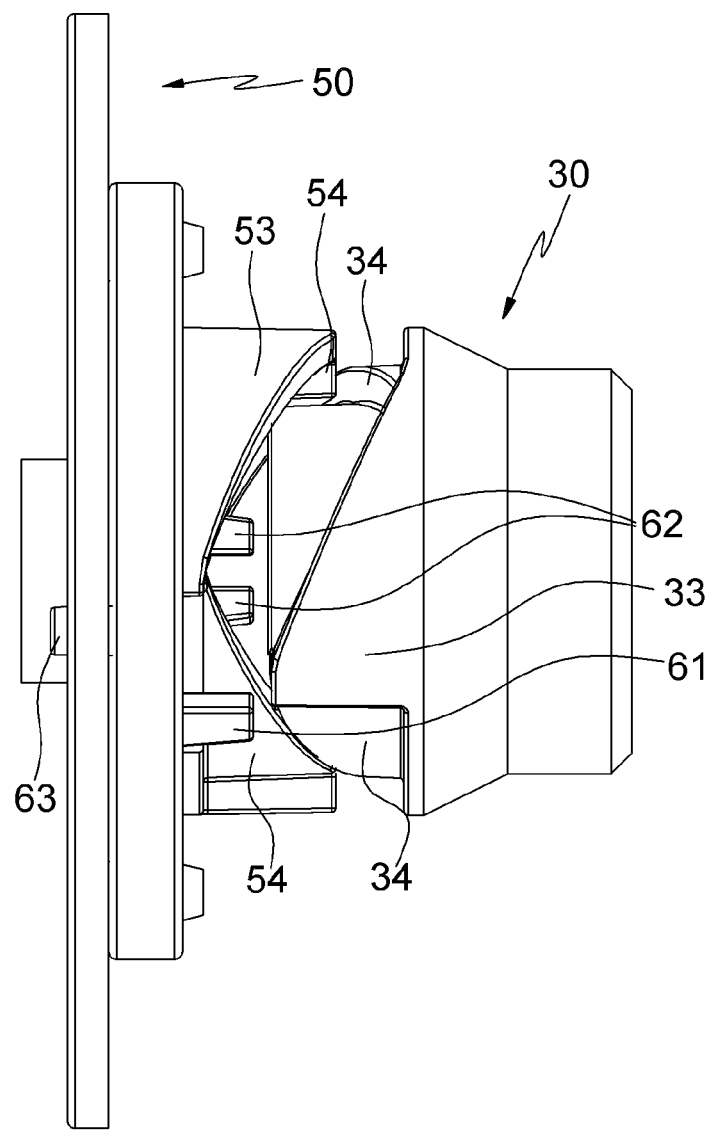

Accordingly, in a situation in which the second embodiment of the present invention is mounted on a fishing reel for the right handed (or the left handed) in which the spool 10 is rotatable in the other direction, after the direction of rotation of the spool cam 30 is set to be the same as that of the spool 10 using the locking lever 60, casting is performed. Then, when the rotation of the spool 10 is accelerated to a predetermined speed or higher while the fishing line is being unwound, the fourth cam portions 54 of the movable cam 50 move outwards on the second cam portions 34 of the spool cam 30, as illustrated in FIG. 8D, so that braking force is generated. When the rotation speed of the spool 10 is decelerated to a predetermined speed or lower, the movable cam 50 is returned to the original position in the direction of the spool cam 30 by the compressive spring 71, so that the braking force is removed.

When the locking lever 60 has been rotated in opposite directions, the catching protrusions 57a are caught by one of the catching recesses 64 to prevent the locking lever 60 from rotating. Unless the direction of the locking lever 60 is intentionally changed using the operation lugs 63, the locking lever 60 remains in the initially set position.

When the direction of rotation of the spool cam 30 can be changed using the locking lever 60 as in the second embodiment as described above, the present invention may be applied irrespective of whether the fishing reel is a left-handed fishing reel or a right-handed fishing reel. Advantageously, the present invention may be fabricated and used in an integrated manner, dedicated to a left-handed application or a right-handed application.

According to the first and second embodiments of the present invention as described above, the distance between the braking magnets 22 and the brake pad 40 may be automatically adjusted by the inertia changing in response to the acceleration and deceleration of the rotation speed of the spool 10, thereby preventing the backlash. In addition, the braking force may be automatically adjusted to increase or decrease in response to the rotation speed of the spool 10, thereby preventing a decrease in the flying distance that would otherwise be caused by the application of the attractive force of the braking magnets 22 during low-speed rotation of the spool 10.

In addition, according to the present invention, the brake pad 40 does not contact the braking magnets 22, noise and abrasion of components may be prevented from being caused by friction. During casting, braking force optimized to real-time rotation speed of the spool 10 may be without an additional adjustment.

In addition, elastic force may be adjusted by replacing the compressive spring 71 or changing the thickness or material of the brake pad 40, so that braking force may be set in a manner dedicated to the user.

That is, relatively high braking force may be produced for a relatively long time by reducing the elastic force of the compressive spring 71. In contrast, relatively high braking force may be produced for a relatively short time and relatively low braking force may be produced a relatively long time by increasing the elastic force of the compressive spring 71.

In addition, relatively high braking force may be produced by increasing the thickness of the brake pad 40 or replacing the material of the brake pad 40 with a material more influenced by attractive force. In contrast, relatively low braking force may be produced by reducing the thickness of the brake pad 40 or replacing the material of the brake pad 40 with a material less influenced by attractive force.

Furthermore, substantially the same effect as the above-described adjustment of maximum braking force by adjusting the position of the braking magnets 22 may be expected by replacing the washer 73 supporting the compressive spring 71 with a washer having a different thickness.

According to the variety of methods of adjusting the braking force as described above, points in time at which maximum braking force is generated and lengths of time during which the braking force exists may be changed at the convenience of the user.

Although the present invention has been described with respect to the fishing reel including a movable inertia brake with reference to the accompanying drawings, those skilled in the art will appreciate that various modifications, alterations, and substitutions are possible, without departing from the scope and spirit of the present invention as disclosed in the accompanying claims.

What is claimed is:

1. A fishing reel having a movable inertia brake, the fishing reel comprising:
    a spool axially mounted on a reel body to be rotatable, wherein the spool includes a body allowing a fishing line to be wound on an outer surface thereof and a hub connected to an inner portion of the body, with a shaft being coupled to the hub while extending through the hub;
    braking magnets provided outside of an outer portion of one side of the spool;
    a spool cam fitted to the hub to rotate together with the spool, and having a pressing portion protruding in one direction such that lowest points and highest points are circumferentially connected on an incline; and
    a spool plate fitted and coupled to one end of the shaft to be movable back and forth in a longitudinal direction of the shaft in an open area in one side of the body, wherein the spool plate includes a brake pad decelerating a rotation speed of the spool in response to attractive force of the braking magnets being applied thereto and a pressed portion coupled to the other side of the brake pad to protrude in the other direction to be in contact with the pressing portion,
    wherein, when a rotation of the spool is accelerated to a predetermined speed or higher, the pressed portion located at the lowest points of the pressing portion is moved upwards on the pressing portion toward the highest points of the pressing portion in response to an action of inertia, so that a distance between the braking magnets and the brake pad is reduced in response to the spool plate moving in a direction of one side, so that a braking force to the rotation of the spool is generated and increased,
    wherein the pressing portion comprises a dual cam including a first cam portion and a second cam portion, the first cam portion extending from the lowest point in one side toward the highest point located in the other side opposite to the lowest point to be upwardly inclined in both directions, and the second cam portion having a different diameter from the first cam portion, being arranged concentrically with the first cam portion, and extending from the lowest point in the other side toward the highest point to be upwardly inclined in both directions, so as to be symmetrical to the first cam portion, and the pressed portion comprises a dual cam including a third cam portion and a fourth cam portion, the third cam portion having a shape corresponding to the first cam portion and configured to be in contact with a leading end of the first cam portion, and the fourth cam portion having a shape corresponding to the second cam portion and configured to be in contact with a leading end of the second cam portion.

2. The fishing reel according to claim 1, further comprising an elastic member pressing the spool plate in a direction of the other side to move away from the braking magnets, wherein, when the rotation of the spool is decelerated to a predetermined speed or lower, an elastic force of the elastic member exceeds the inertia, and the pressed portion is moved downwards on the pressing portion toward the lowest points of the pressing portion, so that the distance between the braking magnets and the brake pad is increased in response to the spool plate moving in a direction of the other side, so that the braking force to the rotation of the spool is reduced and removed.

3. A fishing reel having a movable inertia brake, the fishing reel comprising:

a spool axially mounted on a reel body to be rotatable, wherein the spool includes a body allowing a fishing line to be wound on an outer surface thereof and a hub connected to an inner portion of the body, with a shaft being coupled to the hub while extending through the hub;

braking magnets provided outside of an outer portion of one side of the spool;

a spool cam fitted to the hub to rotate together with the spool, and having a pressing portion protruding in one direction such that lowest points and highest points are circumferentially connected on an incline; and a spool plate fitted and coupled to one end of the shaft to be movable back and forth in a longitudinal direction of the shaft in an open area in one side of the body, wherein the spool plate includes a brake pad decelerating a rotation speed of the spool in response to attractive force of the braking magnets being applied thereto and a pressed portion coupled to the other side of the brake pad to protrude in the other direction to be in contact with the pressing portion, wherein, when a rotation of the spool is accelerated to a predetermined speed or higher, the pressed portion located at the lowest points of the pressing portion is moved upwards on the pressing portion toward the highest points of the pressing portion in response to an action of inertia, so that a distance between the braking magnets and the brake pad is reduced in response to the spool plate moving in a direction of one side, so that a braking force to the rotation of the spool is generated and increased, wherein the pressing portion comprises a dual cam including two or more first cam portions and two or more second cam portions, the first cam portions extending from the lowest point in one side toward the highest point in the other side to be upwardly inclined in one direction, and being spaced apart from each other a predetermined distance in a circumferential direction, and the second cam portions having a different diameter from the first cam portions, being arranged concentrically with the first cam portions, extending from the lowest point in one side toward the highest point in the other side to be upwardly inclined in the other direction, and being spaced apart from each other a predetermined distance in a circumferential direction, the pressed portion comprises a dual cam including two or more third cam portions and fourth cam portions, the third cam portions having a shape corresponding to the first cam portions and being configured to be in surface contact with leading ends of the first cam portions, and the fourth cam portions having a shape corresponding to the second cam portions and being configured to be in contact with leading ends of the second cam portions, the movable cam has a first guide hole and a second guide hole provided in a circumferential direction between the adjacent third cam portions and between the adjacent fourth cam portions, and the fishing reel further includes a locking lever situated between and coupled to the brake pad and the movable cam to be rotatable circumferentially in both directions, the locking lever including a first stopper and a second stopper protruding from the other side to extend through guide holes to be fitted between the first cam portions and between the second cam portions, wherein, when the locking lever is rotated in a direction, one of the stoppers is caught by one end of the first cam portions or the other end of the second cam portions to restrict a direction of rotation of the spool cam to a single direction.

4. The fishing reel according to claim 3, further comprising an elastic member pressing the spool plate in a direction of the other side to move away from the braking magnets, wherein, when the rotation of the spool is decelerated to a predetermined speed or lower, an elastic force of the elastic member exceeds the inertia, and the pressed portion is moved downwards on the pressing portion toward the lowest points of the pressing portion, so that the distance between the braking magnets and the brake pad is increased in response to the spool plate moving in a direction of the other side, so that the braking force to the rotation of the spool is reduced and removed.

* * * * *